United States Patent
Kirschbaum et al.

(10) Patent No.: US 9,744,991 B2
(45) Date of Patent: Aug. 29, 2017

(54) METHOD FOR COMPENSATING THE PLAY IN THE GEARING BETWEEN A STEERING WHEEL AND A STEERING VALVE

(71) Applicant: TEDRIVE STEERING SYSTEMS GMBH, Wulfrath (DE)

(72) Inventors: Sven Kirschbaum, Mettmann (DE); Olaf Schulte, Ratingen (DE)

(73) Assignee: Tedrive Steering Systems GmbH, Wülfrath (DE)

( * ) Notice: Subject to any disclaimer, the term of this patent is extended or adjusted under 35 U.S.C. 154(b) by 0 days.

(21) Appl. No.: 14/401,055

(22) PCT Filed: May 16, 2013

(86) PCT No.: PCT/EP2013/060193
§ 371 (c)(1),
(2) Date: Nov. 13, 2014

(87) PCT Pub. No.: WO2013/174723
PCT Pub. Date: Nov. 28, 2013

(65) Prior Publication Data
US 2015/0127220 A1    May 7, 2015

(30) Foreign Application Priority Data
May 21, 2012 (DE) .......................... 10 2012 104 369

(51) Int. Cl.
*B62D 5/09* (2006.01)
*B62D 5/083* (2006.01)

(52) U.S. Cl.
CPC ............. *B62D 5/09* (2013.01); *B62D 5/0835* (2013.01)

(58) Field of Classification Search
CPC ................................. B62D 5/09; B62D 5/0835
See application file for complete search history.

(56) References Cited

U.S. PATENT DOCUMENTS 5,036,933 A * 8/1991 Heinrich .............. B62D 7/1563
                                                      180/415
5,372,214 A * 12/1994 Haga ..................... B62D 5/065
                                                      180/422

(Continued)

FOREIGN PATENT DOCUMENTS

CN          202107020 U   *  1/2012
DE            20316602 U1     3/2004
(Continued)

OTHER PUBLICATIONS

International Search Report issued Aug. 27, 2013 re: Application No. PCT/EP2013/060193; citing: DE 203 16 602 U1, WO 2006/069922 A2 and DE 10 2004 015991 A1.

Primary Examiner — Tuan C. To

(57) ABSTRACT

An operating method for a hydraulic servo steering system of a motor vehicle includes a steering cylinder that applies the supporting force to a steering gearing is integrated into a hydraulic circuit by means of a steering valve. The steering valve opening specifies the supporting force, wherein the supporting force is set by the steering valve in accordance with a steering torque applied to a steering wheel, by means of a gearing having play. The steering system further includes an actuator that acts on the gearing in order to cause relative adjustment of the gearing. The opening method provides for a compensation step in which, provided that a steering direction reversal is detected, the gearing is relatively adjusted by means of the actuator in a direction opposite the prior engagement direction of the gearing for a predefined duration or a predefined adjustment distance.

13 Claims, 2 Drawing Sheets

(56) References Cited

U.S. PATENT DOCUMENTS

| | | | |
|---|---|---|---|
| 5,511,360 A | 4/1996 | Bakker et al. | |
| 5,761,627 A * | 6/1998 | Seidel | B62D 5/065 180/442 |
| 5,762,159 A * | 6/1998 | Matsuoka | B62D 5/065 180/417 |
| 5,828,971 A * | 10/1998 | Diekhans | A01B 69/008 180/422 |
| 6,230,839 B1 * | 5/2001 | Elser | B62D 5/06 180/417 |
| 6,260,642 B1 * | 7/2001 | Yamamoto | B62D 11/08 180/6.7 |
| 8,074,763 B2 * | 12/2011 | Hung | B62D 5/09 180/417 |
| 2002/0065639 A1 * | 5/2002 | Hsi | F16L 55/033 703/8 |
| 2004/0148078 A1 * | 7/2004 | Nakano | B60C 23/00 701/41 |
| 2005/0092948 A1 | 5/2005 | Heitzer | |
| 2005/0288839 A1 * | 12/2005 | Auer | B62D 6/003 701/41 |
| 2006/0167600 A1 * | 7/2006 | Nelson | A01B 69/008 701/23 |
| 2009/0223737 A1 * | 9/2009 | Crossman | B62D 5/065 180/422 |
| 2011/0093167 A1 * | 4/2011 | Williams | B62D 5/065 701/41 |
| 2011/0187065 A1 * | 8/2011 | Van Der Knaap | B60G 17/0152 280/5.507 |
| 2011/0272204 A1 * | 11/2011 | Nell | B62D 6/10 180/441 |
| 2012/0067664 A1 * | 3/2012 | Nakakuki | B62D 5/064 180/417 |
| 2012/0097472 A1 * | 4/2012 | Kubo | B62D 5/065 180/422 |
| 2012/0217083 A1 * | 8/2012 | Brickner | B62D 5/001 180/417 |
| 2012/0217084 A1 * | 8/2012 | Fu | B62D 5/087 180/441 |
| 2012/0283909 A1 * | 11/2012 | Dix | B60D 1/36 701/41 |
| 2013/0001006 A1 * | 1/2013 | Gibson | B62D 5/0481 180/446 |

FOREIGN PATENT DOCUMENTS

| | | | | |
|---|---|---|---|---|
| DE | 102004049686 A1 | 6/2005 | | |
| DE | 102004015991 A1 | 11/2005 | | |
| DE | 102007028529 A1 | 1/2009 | | |
| DE | 102009029532 A1 | 11/2010 | | |
| DE | 102010048892 A1 * | 4/2012 | | B60T 10/02 |
| EP | 1514766 A1 | 3/2005 | | |
| FR | EP 0630772 A1 * | 12/1994 | | B60G 17/0152 |
| JP | 06-344934 | 12/1994 | | |
| JP | 2000-271950 | 10/2000 | | |
| JP | 2005-028986 | 2/2005 | | |
| JP | 2005-180734 | 5/2005 | | |
| JP | 2006-312411 | 5/2006 | | |
| WO | 2006069922 A2 | 7/2006 | | |

* cited by examiner

METHOD FOR COMPENSATING THE PLAY IN THE GEARING BETWEEN A STEERING WHEEL AND A STEERING VALVE

FIELD

The disclosure relates to a hydraulic servo steering system and an associated operating method wherein a steering cylinder that applies the supporting force to a steering gearing is integrated into a hydraulic circuit by means of a steering valve. The supporting force is set by the steering valve in accordance with a steering torque applied to a steering wheel by means of a gearing having play. The steering system also comprises an actuator that acts on the gearing in order to cause the relative adjustment of the gearing.

BACKGROUND

A common hydraulic servo steering system 1 of a motor vehicle such as a passenger car shown in FIG. 1 serves for the steering adjustment of the wheels 2, especially the front wheels, of a two-track motor vehicle. The wheels 2 are swivelled or turned about their steering axis by means of a steering gearing 3. This is initiated by the driver of the motor vehicle with his steering wheel 4, which is connected to the steering gearing 3 by means of a steering shaft 5, also called steering column, by interposing a so-called steering gear. The steering column 5 comprises an input shaft 6 and a pinion shaft 7. A supporting force can be applied to this steering gearing 3 by means of a so-called steering cylinder 8 formed as a hydraulic synchronized cylinder. This is done depending on the degree of left and right wheel turn imposed by the driver by means of a steering valve, the action of which is coupled to the torsion bar or the torsional moment applied to it, respectively, which in turn corresponds to the steering torque applied by the driver. Thus, the steering valve specifies the dependence between steering torque and supporting force.

Such customary hydraulic power steering systems or servo steering system, respectively, are characterized by high energy density, high maximum force as well as good dynamic performance.

The steering valve acts to set the supporting force by varying a steering valve opening, and thus acts in direct dependence on a steering torque applied to the steering wheel. Furthermore, steering systems are known, wherein the steering valve opening is set by means of a gearing, for example a pinion gearing assembly between the pinion shaft and the valve sleeve. In particular, such a gearing is provided in steering systems where, in addition, the ratio between the steering valve opening and the applied steering torque, i.e. the valve characteristics (also called the boost curve) can be varied by an actuator. Such steering systems are for example disclosed in DE 102007028529 A1, EP 1514766 A1 and DE 102004015991A1, and were developed under the term of "torque overlay" to extend the functionality of hydraulic steering in terms of automatic parking and lane keeping. While in conventional steering valves, the steering valve opening and thus the initiating steering support is directly associated to the steering torque applied to the steering wheel, herein additional adjustment is enabled by means of an actuator. For example, in a conventional steering system, the pinion shaft engaged in the rack is fixedly connected to the valve sleeve, while in valves according to the disclosure, for example, a relative movement caused by the actuator is possible. There are various technical approaches known to a person skilled in the art.

All these approaches suffer from the disadvantage that the gearing has play, and, as a consequence, in changes of steering direction there is a steering angle range in which the steering valve opening is not following the steering torque and is trailing. This strongly hampers steering control; and at best causing a very indirect steering control that is perceived as a disadvantage; generally, the driver will sense this play as an unsteady steering torque, especially with multiple changes of direction, for example in long lasting curves. This unsteady feeling is also called "handshake". Such a handshake especially occurs at high differential pressures of both chambers in the hydraulic cylinder and with a steep boost curve, since in this working range, a small differential angle due to the play does cause clearly greater differential pressures.

Thus, a need exists to improve steering performance and in particular to avoid the disadvantages of play in the gearing that controls the steering valve adjustment, at least in special steering situations, and to improve the response performance of a hydraulic servo steering system.

SUMMARY

The disclosed operating method for a hydraulic servo steering system provides for a steering cylinder applying the supporting force to a steering gearing by means of a steering valve, the steering valve opening of which defines the supporting force, which is integrated into a hydraulic circuit. Furthermore, the hydraulic circuit for example comprises a hydraulic pump that applies pressure to the hydraulic fluid to cause circulation.

The steering valve 9 shown in FIG. 2 according to the disclosed operating method causes adjustment of the supporting force by varying a steering valve opening (not shown) of the steering valve 9 in direct dependence on a steering torque applied to a steering wheel 4. According to the disclosure, variation of the steering valve opening is caused by means of a gearing 10 having play, which, for example, applies the steering movement of the pinion shaft 7 to a valve sleeve (not shown) of the steering valve 9. Furthermore, the disclosure provides for an actuator 11 that acts on the gearing 10 in order to cause relative adjustment of the gearing 10, i.e. for example a rotation of the valve sleeve in relation to the pinion shaft 7.

According to the disclosure, the operating method thus comprises a compensation step, in which, provided that a steering direction reversal is detected, the gearing is relatively adjusted by means of the actuator in a direction opposite the prior engagement direction of the gearing for a predefined duration or a predefined adjustment distance. For example, the reversal of the engagement direction can mean reversing the rotational direction of a pinion gearing. This measure can at least partly compensate for the play, i.e. for the backlash caused by the play. It is thus avoided that upon change of steering direction the steering valve opening does not follow the steering torque. The resulting impairment of the steering feel, such as the so-called handshake, is reduced, if not eliminated.

The term hydraulic servo steering system should be interpreted broadly to include all steering systems having hydraulic servo steering and is not limited to a rack and pinion steering system, i.e. a rack and pinion engagement between steering column and steering rod. For example, it could also be a hydraulically assisted block steering system or a hydraulically assisted recirculating ball steering system. Preferably, the servo steering system comprises a rack and a pinion engaging in the rack as well as an output shaft joined with pinion in a torque-proof manner, which is also called pinion shaft, and the gearing is provided between the steering valve and the output shaft.

BRIEF DESCRIPTION OF THE DRAWINGS

Further characteristics and advantages of the disclosure will become better apparent from the detailed description of a particular, but not exclusive, embodiment of the hydraulic servo steering system according to the disclosure, which is illustrated by way of non-limiting example in the accompanying drawings wherein.

DETAILED DESCRIPTION OF THE DRAWINGS

Figure 1:
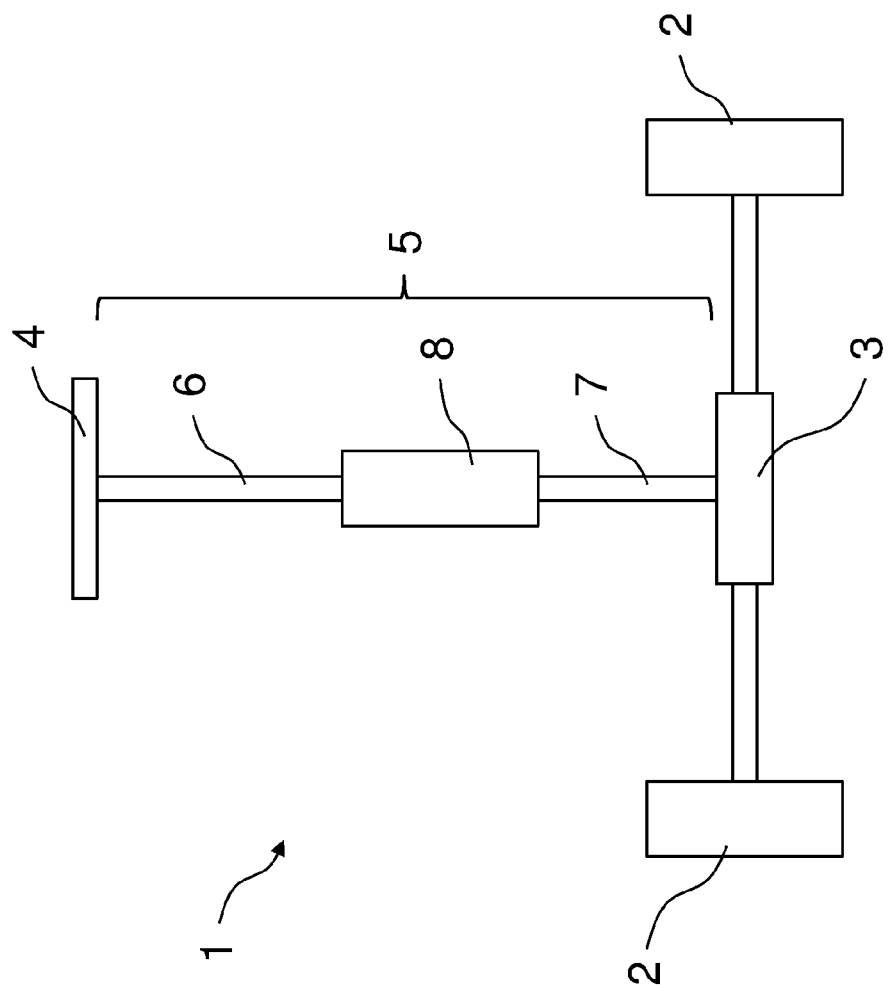
FIG. 1 is an elevational view of a conventional hydraulic servo steering system.

According to an advantageous embodiment, the ratio between the steering valve and the applied steering torque and thus the valve characteristics (also called the boost curve) can be varied by an actuator. Such steering valves are known, for example, from DE 102007028529 A1, EP 1514766 A1 and DE 102004015991A1: they were developed under the term "torque overlay" to extend the functionality of hydraulic steering in terms of automatic parking and lane keeping. While in conventional steering valves, the steering valve opening and thus the initiating steering support is directly connected with the steering torque applied to the steering wheel, herein an additional overlaid adjustment is enabled by means of an actuator. A gearing is provided between the actuator and the steering valve. Manufacture of a gearing having reduced play is expensive and complex since the gearing components must have narrow manufacturing tolerances. For example, in a conventional steering system, the pinion shaft engaging in the rack and the valve sleeve are attached to each other while in the valves according to the disclosure the actuator allows relative adjustment of the steering valve opening. There are many technical approaches for this, which are familiar to persons skilled in the art.

According to one embodiment, variation of the steering valve characteristics means a rotating adjustment of the steering valve sleeve relative to the position defined by the position of the pinion shaft. The steering cylinder 8 shown in FIG. 2 applies the supporting force to a steering gearing 3 and is integrated into a hydraulic circuit by means of a steering valve 9. The supporting force is set by the steering valve 9 in accordance with a steering torque applied to a steering wheel 4 by means of a gearing 10 having play. The steering system 1 also comprises an actuator 11 that acts on the gearing 10 in order to cause the relative adjustment of the gearing 10.

Figure 2:
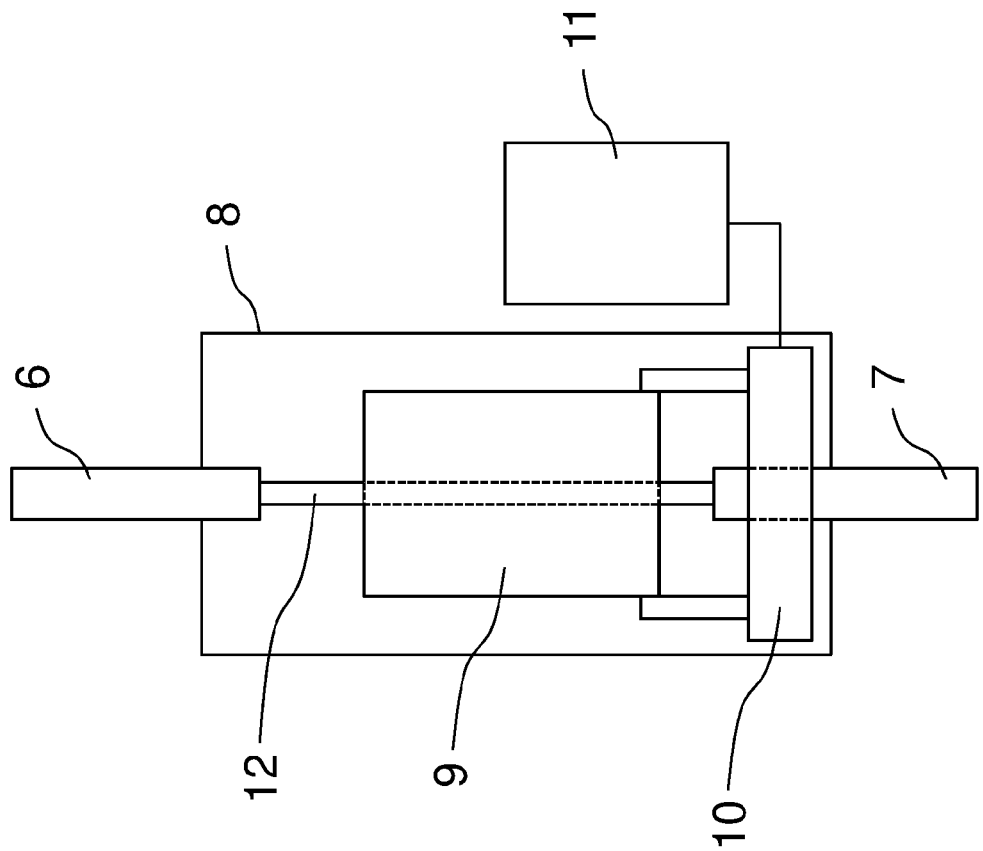
FIG. 2 is an elevational view of a steering cylinder of a steering system according to the disclosure.

In the embodiment illustrated in FIG. 2, the pinion shaft 7 and the input shaft 6 can be reversibly rotated in relation to each other by means of a torsion rod 12. The position of the valve sleeve relative to the input shaft determines the supporting force. Thus, relative rotation of the valve sleeve also causes rotation relative to the input shaft, and the supporting force is varied by the rotation.

According to a simple embodiment, the maximum adjustment distance caused by the actuator is fixedly determined for all steering situations as a constant value and is thus adapted to the play of the gearing. Although this procedure according to the disclosure minimizes the "handshake", this "rigid" procedure is not optimal and has a detrimental effect on the stability for regulating the supporting force. It is therefore preferable that the maximum adjustment distance and/or the adjustment time and/or adjustment speed is selected according to steering parameters such as the current or prior steering torque and/or the current steering speed, to correct the play depending on the steering situation. For example, the maximum adjustment distance depends on the steering angle and increases as the steering angle increasingly varies from the straight-ahead position.

According to another advantageous embodiment, the adjustment distance and/or the duration and/or the adjustment speed is selected depending on steering parameters such as the current vehicle speed or the current yaw rate.

According to another embodiment, the compensation step is not provided unless the steering angle is above a certain value. For example, the compensation step is done when the steering angle exceeds a few degrees, such as 1 degree, in relation to the straight-ahead position.

According to another embodiment, it is provided that the play of the gearing is detected. In one embodiment, the play is detected by means of a torque sensor between the input shaft and the steering valve sleeve in appropriate driving or steering situations. For example, play can also be determined during production of the steering system.

In another advantageous embodiment, the steering angle is detected and saved while the steering direction is reversed, and in the following compensation step, the adjustment distance of the actuator is selected proportional to the difference between the current and the saved steering angle.

According to one embodiment, it is provided that steering direction reversal, i.e. the reversal of the steering wheel's rotational direction, is detected by means of a steering angle sensor on the pinion shaft.

Preferably, the steering direction reversal is detected with a steering angle sensor, which directly detects the rotational direction of an input shaft having torque-proof connection to the steering wheel.

According to an advantageous embodiment, the steering valve has a planetary gearing to vary the valve characteristics effected by the actuator. Such steering valves are characterized by their particularly quick and precise adjustability of the valve characteristics. Such a steering valve is known from DE 102004049686 A1. Even more preferred is the embodiment described in DE 102009029532, which is fully incorporated herein by reference.

It is preferred that the actuator according to the disclosure is an electromechanical actuator such as a multiphase motor or servomotor.

According to another aspect of an embodiment of the method of the disclosure, the predefined maximum adjustment distance is set steadily with the actuator, for example with a constant or sinusoidal increase toward the maximum setting, i.e. the actuator is set to avoid any abrupt adjustment. This prevents the readjustment from being acoustically recognizable and/or haptically recognizable on the steering wheel by means of the steering tract. A constant increase means for example a linearly increasing adjustment up to a maximum adjustment distance that may correspond to that of the gearing play. A sinusoidal increase means an increase corresponding to the sinusoidal pattern between 0 and 90°. Preferably, the steepness, i.e. the speed at which the steady adjustment occurs, is selected depending on the steering situation, for example depending on the steering angle existing prior to the adjustment and/or the current steering speed. For example, at a high steering speed (i.e. quick change of the yaw angle), the actuator changes to the maximum adjustment distance in just a few microseconds, while at a slow steering speed, an adjustment can be done in 100 ms or more.

The disclosure also relates to a hydraulic servo steering system comprising: a hydraulic circuit, a steering cylinder integrated into the hydraulic circuit applying an supporting force to a steering gearing, a steering valve integrated into the hydraulic circuit which sets the supporting force in accordance with a steering torque applied to the steering wheel, by means of a gearing having play. The steering system also comprises an actuator that acts on the gearing in order to cause relative adjustment thereof, and a control unit wherein the control unit is formed to perform the operating method according to one of the embodiments described above. The disclosure thus comprises a compensation step in which, provided that a steering direction reversal is detected, the gearing is relatively adjusted by means of the actuator in a direction opposite the prior engagement direction of the gearing for a predefined duration or a predefined relative adjustment distance. Reversal of the engagement direction means, for example, reversal in rotating direction of a pinion gearing. This measure can at least partially compensate for the play, i.e. for the backlash caused by the play. It is avoided that upon change of steering direction, the steering valve opening does not follow the steering torque. The resulting impairment of the steering feel, such as the so-called handshake, is reduced or even eliminated. Steering systems, which are correspondingly equipped, can be manufactured more cost-effectively since manufacturing tolerances can be reduced.

The invention claimed is:

1. An operating method for a hydraulic servo steering system of a motor vehicle including the following steps: applying a supporting force to a steering gearing by a steering cylinder integrated into a hydraulic circuit by means of a steering valve, a steering valve opening of which specifies the supporting force, setting the supporting force is set by the steering valve in accordance with a steering torque applied to a steering wheel, by means of a gearing having play, wherein an actuator is acting on the gearing having play in order to cause relative adjustment thereof, wherein the operating method includes a compensation step in which, provided that a steering direction reversal is detected, the gearing having play is adjusted by means of the actuator in a direction opposite a prior engagement direction of the gearing for a predefined duration or a predefined adjustment distance.

2. The operating method according to claim 1 comprising at least one further step, wherein a variation of valve characteristics is performed by means of the actuator and the gearing.

3. The operating method according to claim 1, wherein an adjustment distance, an adjustment duration, or an adjustment speed is selected depending on steering parameters including a current steering angle, and a current or prior steering torque, or a current steering speed.

4. The operating method according to claim 1, wherein an adjustment distance, or an adjustment duration, or an adjustment speed is selected depending on steering parameters including a current vehicle speed and a current yaw rate.

5. The operating method according to claim 1, wherein the compensation step is not provided unless a steering angle is above a certain predefined value.

6. The operating method according to claim 1, wherein a detection step is provided in which the play of the gearing is detected.

7. The operating method according to claim 1, wherein a steering angle present during steering direction reversal is measured and saved in a detection, and a maximum adjustment distance of the actuator is selected in a subsequent compensation step proportional to a difference between a current steering angle and a saved steering angle.

8. The operating method according to claim 1, wherein detection of a steering direction reversal is done by a steering angle sensor, which directly detects a rotational direction of an input shaft having torque-proof connection to a steering wheel.

9. The operating method according to claim 1, wherein the steering valve is provided with at least one planetary gearing to vary valve characteristics by means of the actuator.

10. The operating method according to claim 1, wherein the actuator is an electromechanical actuator.

11. The operating method according to claim 1, wherein the predefined adjustment distance is set steadily by means of the actuator.

12. The operating method according to claim 1, wherein the servo steering system further includes a rack and a pinion engaging in the rack as well as a pinion shaft having torque-proof connection to the pinion and that the gearing is provided between the steering valve and the pinion shaft.

13. A hydraulic servo steering system comprising: a hydraulic circuit, a steering cylinder integrated into the hydraulic circuit applying a supporting force to a steering gearing, a steering valve integrated into the hydraulic circuit which sets the supporting force in accordance with a steering torque applied to the steering wheel, by means of a gearing having play, wherein the steering system further includes an actuator that acts on the gearing in order to cause relative adjustment thereof as well as a control unit, wherein the control unit the hydraulic circuit, the steering cylinder, the steering gearing, the steering valve, the steering wheel and the actuator are configured to perform the operation method according to claim 1.

* * * * *